(12) United States Patent
Kaiser et al.

(10) Patent No.: US 10,835,992 B2
(45) Date of Patent: Nov. 17, 2020

(54) LASER MACHINING MACHINES AND METHODS FOR LAP WELDING OF WORKPIECES

(71) Applicant: TRUMPF LASER GMBH, Schramberg (DE)

(72) Inventors: Elke Kaiser, Aichhalden (DE); Gerhard Broghammer, Boesingen (DE)

(73) Assignee: TRUMPF LASER GMBH, Schramberg (DE)

( * ) Notice: Subject to any disclaimer, the term of this patent is extended or adjusted under 35 U.S.C. 154(b) by 248 days.

(21) Appl. No.: 15/936,885

(22) Filed: Mar. 27, 2018

(65) Prior Publication Data

US 2018/0214981 A1 Aug. 2, 2018

Related U.S. Application Data

(63) Continuation of application No. PCT/EP2016/072907, filed on Sep. 27, 2016.

(30) Foreign Application Priority Data

Sep. 28, 2015 (DE) .................. 10 2015 218 564

(51) Int. Cl.
*B23K 26/06* (2014.01)
*B23K 26/073* (2006.01)
(Continued)

(52) U.S. Cl.
CPC ...... *B23K 26/0665* (2013.01); *B23K 26/0622* (2015.10); *B23K 26/0648* (2013.01);
(Continued)

(58) Field of Classification Search
CPC ............ B23K 26/0665; B23K 26/0622; B23K 26/073; B23K 26/22; B23K 26/0648; B23K 2201/42
(Continued)

(56) References Cited

U.S. PATENT DOCUMENTS 4,636,611 A 1/1987 Penney
2001/0019044 A1 9/2001 Bertez et al.
(Continued)

FOREIGN PATENT DOCUMENTS

CN 101573204 11/2009
CN 102325627 1/2012
(Continued)

OTHER PUBLICATIONS

International Search Report and Written Opinion in International Application No. PCT/EP2016/072907, dated Jan. 4, 2017, 24 pages (with English translation).
(Continued)

*Primary Examiner* — Thien S Tran
(74) *Attorney, Agent, or Firm* — Fish & Richardson P.C.

(57) ABSTRACT

In a laser machining machine (1) for laser welding of workpieces, in particular for lap welding of DBC structures, comprising a laser beam generator for generating a laser beam and an optical imaging system for imaging the laser beam into a machining plane, according to the invention, the optical imaging system comprises an optical beam-shaping system, which images the laser beam in the machining plane with an imaging depth ($\Delta d$) of at least ±2 mm, preferably of at least ±5 mm, in such a way that the radial power density distribution ($P_r$) of the laser beam is bell-shaped along the imaging depth ($\Delta d$) in each plane at right angles to the beam axis and the maximum values ($P_{max}$) of these bell-shaped power density distributions ($P_r$) along the imaging depth
(Continued)

(Δd) vary in relation to one another by less than 10%, preferably by less than 5%.

17 Claims, 2 Drawing Sheets

(51) Int. Cl.
  *B23K 26/22* (2006.01)
  *B23K 26/0622* (2014.01)
  *B23K 101/42* (2006.01)
(52) U.S. Cl.
  CPC ............ *B23K 26/073* (2013.01); *B23K 26/22* (2013.01); *B23K 2101/42* (2018.08)
(58) Field of Classification Search
  USPC .... 219/125.1, 121.6, 121.63, 121.76, 121.81
  See application file for complete search history.

(56) References Cited

U.S. PATENT DOCUMENTS

| | | | |
|---|---|---|---|
| 2011/0127697 A1 | 6/2011 | Milne | |
| 2012/0031883 A1 | 2/2012 | Kumamoto et al. | |
| 2014/0097161 A1* | 4/2014 | Watanabe | B23K 26/38 219/121.63 |
| 2015/0158120 A1 | 6/2015 | Courvoisier et al. | |

FOREIGN PATENT DOCUMENTS

| | | | |
|---|---|---|---|
| CN | 103472687 | 12/2013 | |
| CN | 203712073 | 7/2014 | |
| DE | 10005593 | 10/2001 | |
| DE | 10103389 | 8/2002 | |
| EP | 0005460 | 11/1979 | |
| EP | 2361717 | 8/2011 | |
| EP | 2716398 | 4/2014 | |
| JP | H10-296471 A | 11/1998 | |
| JP | 3075571 B2 | 8/2000 | |
| JP | 2006-192503 A | 7/2006 | |
| JP | 200982958 | 4/2009 | |
| JP | 2009082958 A * | 4/2009 | |
| JP | 2011-170052 A | 9/2011 | |
| JP | 2013-075331 A | 4/2013 | |
| JP | 2015-112644 A | 6/2015 | |
| WO | WO 2004034132 | 4/2004 | |
| WO | WO 2007095929 | 8/2007 | |
| WO | WO 2015113811 | 8/2015 | |
| WO | WO-2015113811 A1 * | 8/2015 | ............ B23K 26/22 |

OTHER PUBLICATIONS

CN Office Action in CN Appln. No. 201680056671.7, dated Dec. 18, 2019, 14 pages (with English translation).
JP Office Action in Japanese Appln. No. 2018-516017, dated Jul. 8, 2020, 6 pages (with English translation).

* cited by examiner

LASER MACHINING MACHINES AND METHODS FOR LAP WELDING OF WORKPIECES

CROSS REFERENCE TO RELATED APPLICATIONS

This application is a continuation of and claims priority under 35 U.S.C. § 120 from PCT Application No. PCT/EP2016/072907 filed on Sep. 27, 2016, which claims priority from German Application No. DE 10 2015 218 564.8, filed on Sep. 28, 2015. The entire contents of each of these priority applications are incorporated herein by reference.

TECHNICAL FIELD

This disclosure relates to laser machining machines for laser welding of workpieces, such as for lap welding of Direct Bonded Copper (DBC) structures.

BACKGROUND

DE 100 05 593 C1 discloses a method for spot welding of workpieces in which an optical system including a focusing lens and a flat conical lens (known as an "axicon") shapes a laser beam in such a way as to achieve both a large beam spot and an annular energy distribution in the focal plane that represents the machining plane.

DBC (Direct Bonded Copper) structures are used in high-power electronics and consist of a multilayer system including a ceramic substrate with copper tracks running on it. The copper conducts heat and current, while the ceramic conducts heat and insulates current. The copper tracks must be electrically connected in each case to a terminal contact of copper. This has taken place until now by ultrasonic welding, which however can lead to cracks and a buildup of heat in the ceramic substrate, and therefore does not produce reliable results. Since in the case of DBC structures the copper layer on the ceramic is very thin, the welding process must be performed very reliably and with an exactly reproducible welding-in depth.

SUMMARY

The present disclosure describes laser machining machines and methods for performing very reliable and reproducible welding along the depth as part of a laser welding process. The disclosure describes laser beam generators for generating a laser beam and an optical imaging system for projecting an image of the laser beam into a machining plane, and also methods for laser welding of workpieces, such as for lap welding of direct bonded copper (DBC) structures, in a machining plane by a laser beam.

Advantages are achieved in that the optical imaging system includes an optical beam-shaping system that images the laser beam in the machining plane with an imaging depth of at least ±2 mm, typically of at least ±5 mm, in such a way that the radial power density distribution of the laser beam is bell-shaped along the imaging depth in each plane at right angles to the beam axis and the maximum values of these bell-shaped power density distributions along the imaging depth vary in relation to one another by less than 10%, typically by less than 5%.

As power measurements have shown, the optical beam-shaping system produces a great constancy of the power in the beam direction (z direction) over several millimeters in the region of the imaging depth, and a bell-shaped power density distribution radially in relation to the beam direction. These features lead to reproducible in-depth welding along the depth.

The reproducible welding depth makes it possible for components having a temperature-critical substructure to be laser-welded. Thus, damage to the substructure (for example, a ceramic substrate) of electrically conducting contacts that may otherwise occur during laser welding because of excessively deep weld can be avoided. The disclosure makes it possible in the case of DBC structures in which the copper layer on the ceramic substrate is very thin to have a very reliable welding process with an exactly reproducible welding depth without destroying the ceramic substrate. Because of the bell-shaped power density distribution, other advantages of this disclosure include preventing a buildup of heat between the copper components to be welded, as would occur for example with an annular power density distribution.

In some embodiments, the optical beam-shaping system is formed as a convex or concave axicon, the machining plane lying in an overfocusing region in front of the focal plane of the optical imaging system in the case of a convex axicon and lying in an underfocusing region behind the focal plane in the case of a concave axicon. The axicon may be arranged in the divergent or parallel path of rays of the laser beam, in the latter case it being possible for the axicon to be easily additionally incorporated in many existing optical systems.

In some embodiments, the optical beam-shaping system is formed by a dual-focus objective, the machining plane lying between the two foci of the dual-focus objective. An optical homogenizing system is typically arranged in front of the dual-focus objective which mixes or homogenizes the radial power density distribution of the laser beam. The optical homogenizing system may for example include a light guide (for example a laser light cable), into which the laser beam is directed eccentrically in relation to the axis of the light guide.

In a further aspect, the disclosure also relates to methods for laser welding of workpieces, such as for lap welding of DBCs, in a machining plane by a laser beam, wherein the laser beam is imaged into the machining plane with an imaging depth of at least ±2 mm, e.g., at least ±5 mm, in such a way that the radial power density distribution of the laser beam is bell-shaped along the imaging depth in each plane at right angles to the beam axis and that the maximum values of these bell-shaped power density distributions along the imaging depth vary in relation to one another by less than 10%, e.g., by less than 5%.

Workpieces of copper are typically welded to one another with a pulsed green laser beam (wavelength of for example 515 nm or 532 nm) or with a pulsed IR laser beam.

Further advantages and advantageous refinements of the subject matter of the invention emerge from the description, the claims, and the drawings. Similarly, the features mentioned above and features still to be set out can each be used on their own or together in any desired combinations. The embodiments shown and described should not be understood as an exhaustive list, but rather are of an exemplary character for the description of the invention.

In the description of the figures that follows, identical reference signs are used for components that are the same or functionally the same.

DETAILED DESCRIPTION

Figure 1:
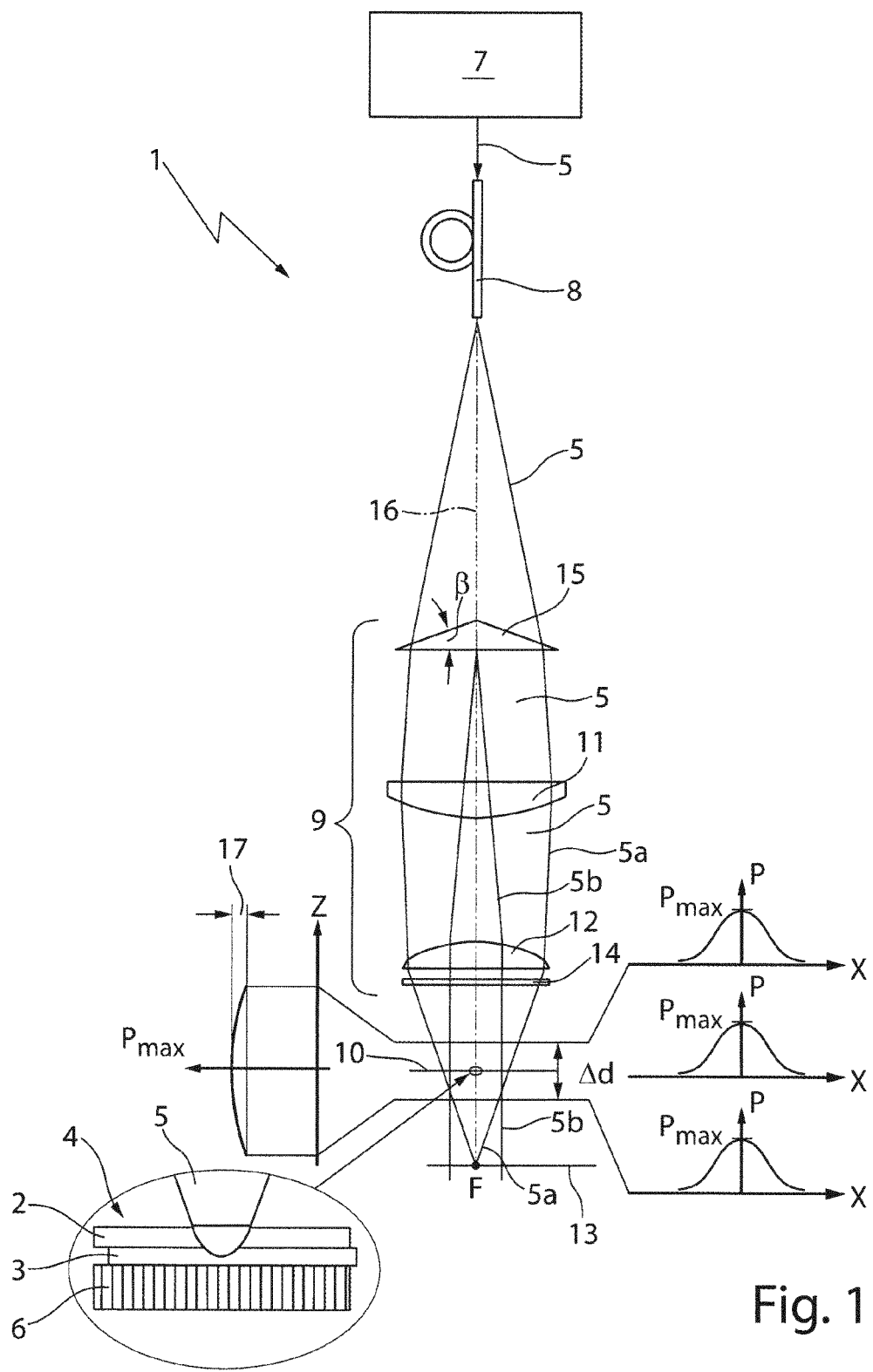
FIG. 1 shows a first laser machining machine with an optical beam-shaping system in the form of an axicon together with the associated power density distribution of the laser beam in the radial direction and in the z direction.

The laser machining machine 1 shown in FIG. 1 serves, for example, for lap welding a terminal contact 2 of copper and a copper track 3 of a DBC (Direct Bonded Copper) structure 4 by a pulsed laser beam 5. The DBC structure 4 has a ceramic substrate 6, on which the copper track 3 is deposited. Since the copper track 3 on the ceramic substrate 6 is very thin, the laser welding process must be performed very reliably and with a reproducible welding depth (along the z-axis).

The laser machining machine 1 includes a laser beam generator 7 for generating the laser beam 5, a laser light cable 8 (LLC), into which the laser beam 5 is coupled, and also an optical imaging system 9 for imaging the laser beam 5 emerging from the LLC 8 into an imaging plane 10, which coincides with the machining plane 10.

The optical imaging system 9 has a collimation lens 11 for collimating the laser beam 5 emerging divergently from the LLC 8 and a focusing lens 12 for focusing the collimated laser beam 5 into a focal plane 13. A protective glass 14 arranged in the focused laser beam 5 protects the focusing lens 12 from damage. In the divergent laser beam 5, that is to say between the LLC 8 and the collimation lens 11, an optical beam-shaping system in the form of a flat conical lens (known as an "axicon") 15 is arranged coaxially in relation to the optical axis 16 with a flank angle β of for example 0.1°, the conical side facing the LLC 8. The axicon 15 transforms the incident divergent laser beam 5 into an annular laser beam 5, the outer marginal rays 5a of which impinge in a collimated manner and the inner marginal rays 5b of which impinge in a divergent manner on the focusing lens 12. The outer marginal rays 5a are focused by the focusing lens 12 into the focal plane 13, to be specific into the focal point F, while the inner marginal rays 5b are not influenced by the focusing lens 12. The machining plane 10 lies in an overfocusing region in front of the focal plane 13, for example 20 mm in front of the focal plane 13.

As power measurements have shown, the additional axicon 15 brings about the effect that the laser beam 5 is imaged in the machining plane 10 with an imaging depth Δd of at least ±2 mm in such a way that the radial power density distribution $P_r$ of the laser beam 5 is bell-shaped along the imaging depth Δd in each plane at right angles to the beam axis. The maximum values $P_{max}$ of these bell-shaped power density distributions $P_r$ in the direction of the optical axis (z direction) 16 along the imaging depth Δd vary in relation to one another by less than 5%. The maximum values $P_{max}$ therefore all lie within a 5% band of variation 17.

In the region of the imaging depth Δd, the laser beam 5 consequently has a great uniformity of power along its optical axis 16 over several millimeters and in each case a bell-shaped radial power density distribution $P_r$. This leads to a great tolerance of the parameters in the machining plane 13, with a very exact welding depth, and consequently a reproducible welding depth. The bell-shaped power density distribution $P_r$ prevents a buildup of heat between the copper components 2, 3 to be welded.

Alternatively, the axicon 15 may also be arranged in the parallel path of rays of the laser beam 5, between the collimation lens 11 and the focusing lens 12.

In FIG. 1, the axicon 15 is formed as a convex axicon, so that the machining plane 10 lies in the overfocusing region in front of the focal plane 13 of the optical imaging system 9. Alternatively, the axicon may also be formed as a concave axicon, so that the machining plane 10 lies in an underfocusing region behind the focal plane 13, for example 20 mm behind the focal plane 13.

Figure 2:
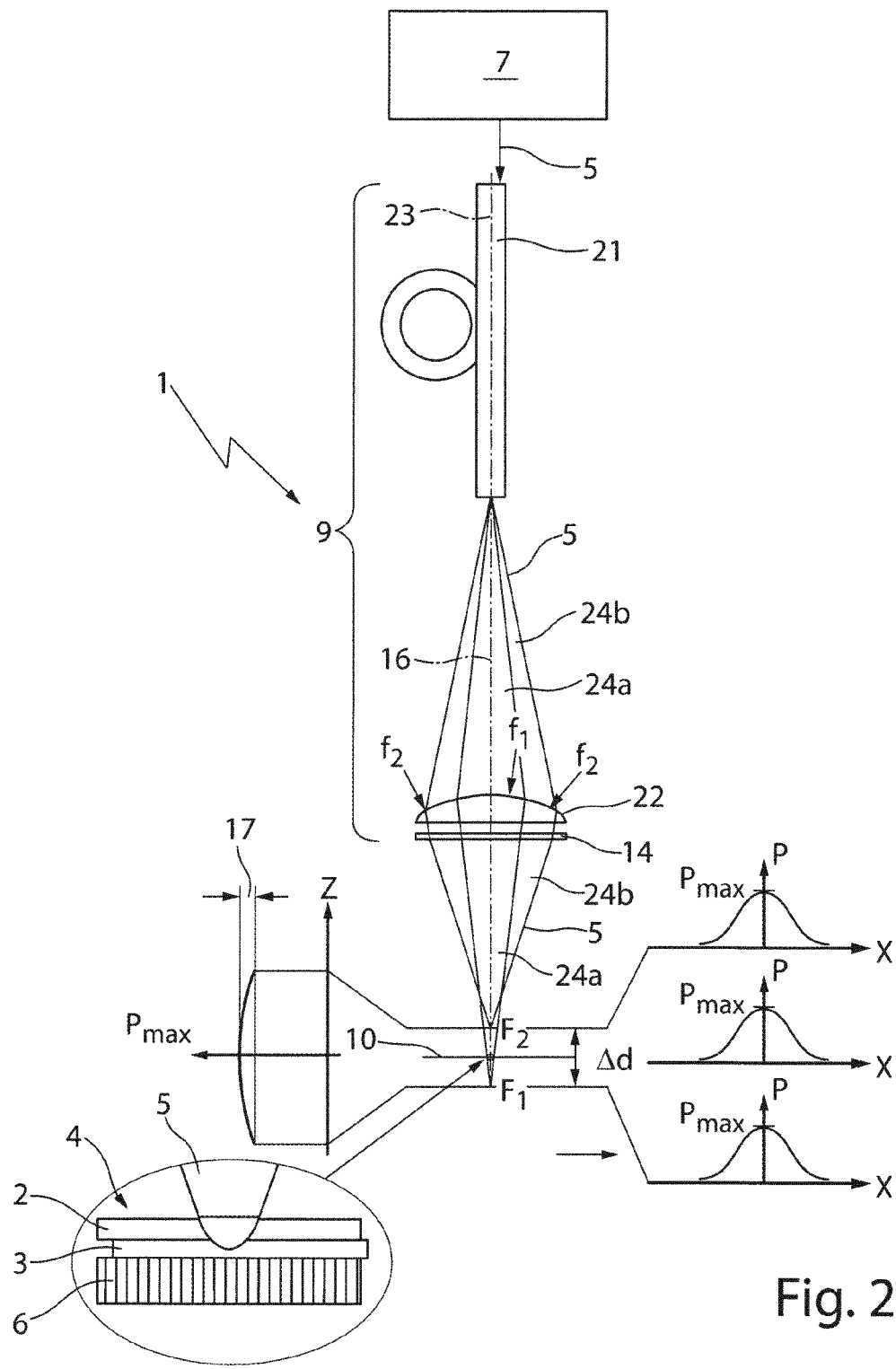
FIG. 2 shows a second laser machining machine with an optical beam-shaping system in the form of a light guide and a dual-focus objective together with the associated power density distribution of the laser beam in the radial direction and in the z direction.

The laser machining machine 1 shown in FIG. 2 differs from FIG. 1 in that here the optical beam-shaping system 9 is formed by an optional optical homogenizing system, which has a laser light cable (LLC) 21, and a downstream dual-focus objective 22 with a focal length $f_1$ in the inner region, a focal length $f_2$ in the outer region, with $f_1 > f_2$. The machining plane 10 lies between the two foci $F_1$, $F_2$ of the dual-focus objective 22. For the purpose of mixing or homogenizing the radial power density distribution, the laser beam 5 is coupled into the LLC 21 eccentrically in relation to the axis 23 of the LLC. The laser beam 5 emerging divergently from the LLC 21 impinges on the dual-focus lens 22, which focuses the inner bundle of rays 24a of the laser beam 5 impinging on its inner region to the focus $F_1$ and focuses the annular bundle 24b of the laser beam 5 impinging on its outer region to the focus $F_2$.

As power measurements have also shown here, the LLC 21 and the dual-focus objective 22 bring about the effect that the laser beam 5 is imaged in the machining plane 10 with an imaging depth Δd of at least ±2 mm in such a way that the radial power density distribution $P_r$ of the laser beam 5 is bell-shaped along the imaging depth Δd in each plane at right angles to the beam axis. The maximum values $P_{max}$ of these bell-shaped power density distributions $P_r$ in the direction of the optical axis 16 (z direction) along the imaging depth Δd vary in relation to one another by less than 5%. The maximum values $P_{max}$ therefore all lie within a 5% band of variation 17.

In the region of the imaging depth Δd, the laser beam 5 consequently has a great uniformity of power along its optical axis 16 over several millimeters and in each case a bell-shaped radial power density distribution $P_r$. This leads to a great tolerance of the parameters in the machining plane 13, with a very exact welding depth, and consequently to a reproducible welding depth. The bell-shaped power density distribution $P_r$ prevents a buildup of heat between the copper components 2, 3 to be welded.

What is claimed is:

1. A laser machining machine for laser welding of workpieces, comprising:
   a laser beam generator that generates a laser beam having a beam axis; and
   an optical imaging system that directs the laser beam into a machining plane, wherein the optical imaging system comprises an optical beam-shaping system comprising an axicon that transforms the incident divergent laser beam into an annular laser beam, wherein outer marginal rays of the annular laser beam impinge in a collimated manner and inner marginal rays of the annular laser beam impinge in a divergent manner on a focusing lens, and wherein the outer marginal rays are focused by the focusing lens into a focal plane, while the inner marginal rays are not influenced by the focusing lens,
   wherein the optical beam-shaping system is configured to image the laser beam in the machining plane with an imaging depth (Δd) of at least ±2 mm such that a radial power density distribution ($P_r$) of the laser beam is bell-shaped along the imaging depth ($\Delta d$) in each plane at right angles to the laser beam axis, and maximum values ($P_{max}$) of the bell-shaped power density distributions ($P_r$) along the imaging depth ($\Delta d$) vary in relation to one another by less than 10%.

2. The laser machining machine of claim 1, wherein the axicon is convexly formed and the machining plane lies in an overfocusing region in front of the focal plane of the optical imaging system.

3. The laser machining machine of claim 1, wherein the axicon is concavely formed and the machining plane lies in an underfocusing region behind the focal plane of the optical imaging system.

4. The laser machining machine of claim 1, wherein the axicon is arranged in the parallel or divergent path of rays of the laser beam.

5. A laser machining machine for laser welding of workpieces, comprising:
   a laser beam generator that generates a laser beam having a beam axis; and
   an optical imaging system that directs the laser beam into a machining plane, wherein the optical imaging system comprises a dual-focus objective having two foci between which the machining plane lies, configured to image the laser beam in the machining plane with an imaging depth ($\Delta d$) of at least ±2 mm such that a radial power density distribution ($P_r$) of the laser beam is bell-shaped along the imaging depth ($\Delta d$) in each plane at right angles to the beam axis, and maximum values ($P_{max}$) of the bell-shaped power density distributions ($P_r$) along the imaging depth ($\Delta d$) vary in relation to one another by less than 10%.

6. The laser machining machine of claim 5, comprising an optical homogenizing system arranged in front of the dual-focus lens to homogenize the radial power density distribution of the laser beam.

7. The laser machining machine of claim 6, wherein the optical homogenizing system comprises a light guide into which the laser beam is coupled eccentrically with respect to an axis of the light guide.

8. The laser machining machine of claim 1, wherein the laser beam is a green pulsed laser beam.

9. The laser machining machine of claim 1, wherein the axicon is configured to image the laser beam in the machining plane with an imaging depth of at least ±5 mm.

10. The laser machining machine of claim 1, wherein the axicon is configured to image the laser beam in the machining plane such that maximum values of the bell-shaped power density distributions along the imaging depth vary in relation to one another by less than 5%.

11. A method for laser welding of workpieces in a machining plane by a laser beam having a beam axis, the method comprising imaging the laser beam into the machining plane with an imaging depth ($\Delta d$) of at least ±2 mm, wherein a radial power density distribution ($P_r$) of the laser beam is bell-shaped along the imaging depth ($\Delta d$) in each plane at right angles to the beam axis and maximum values ($P_{max}$) of these bell-shaped power density distributions ($P_r$) along the imaging depth ($\Delta d$) vary in relation to one another by less than 10%, wherein the laser beam is imaged onto a Direct Bonded Copper (DBC) structure for lap welding.

12. The method as claimed in claim 11, wherein the laser beam is a green pulsed laser beam.

13. The method as claimed in claim 11, wherein the laser beam is imaged into the machining plane with an imaging depth of at least ±5 mm.

14. The method as claimed in claim 11, wherein the laser beam is imaged into the machining plane such that maximum values of the bell-shaped power density distributions along the imaging depth vary in relation to one another by less than 5%.

15. The laser machining machine of claim 5, wherein the laser beam is a green pulsed laser beam.

16. The laser machining machine of claim 5, wherein the dual-focus objective is configured to image the laser beam in the machining plane with an imaging depth of at least ±5 mm.

17. The laser machining machine of claim 5, wherein the dual-focus objective is configured to image the laser beam in the machining plane such that maximum values of the bell-shaped power density distributions along the imaging depth vary in relation to one another by less than 5%.

* * * * *